US012646854B2

(12) United States Patent　　(10) Patent No.:　US 12,646,854 B2
Khaira et al.　　(45) Date of Patent:　Jun. 2, 2026

(54) RECONFIGURABLE INTELLIGENT SURFACES WITH DUAL MODE SIGNAL PROPAGATION IN TRANSMISSION AND REFLECTION SPACE

(71) Applicant: Dell Products L.P., Round Rock, TX (US)

(72) Inventors: Navjot Kaur Khaira, Kanata (CA); Tejinder Singh, Kanata (CA); Morris Repeta, Ottawa (CA)

(73) Assignee: Dell Products L.P., Round Rock, TX (US)

( * ) Notice: Subject to any disclaimer, the term of this patent is extended or adjusted under 35 U.S.C. 154(b) by 281 days.

(21) Appl. No.: 18/523,164

(22) Filed: Nov. 29, 2023

(65) Prior Publication Data

US 2025/0174909 A1　　May 29, 2025

(51) Int. Cl.
*H01Q 15/00*　　(2006.01)
*H01Q 21/00*　　(2006.01)
*H04B 7/04*　　(2017.01)

(52) U.S. Cl.
CPC ..... *H01Q 15/0066* (2013.01); *H01Q 15/0086* (2013.01); *H01Q 21/0093* (2013.01); *H04B 7/04013* (2023.05)

(58) Field of Classification Search
CPC ........... H01Q 15/0066; H01Q 15/0086; H01Q 21/0093; H04B 7/04013
See application file for complete search history.

(56) References Cited

U.S. PATENT DOCUMENTS

| | | | |
|---|---|---|---|
| 4,829,271 A | | 5/1989 | Pitschi et al. |
| 9,923,267 B1 * | | 3/2018 | Pala ......................... H01Q 3/01 |
| 10,833,404 B1 | | 11/2020 | Kaddour et al. |
| 11,133,588 B1 * | | 9/2021 | Matos ...................... H01Q 3/46 |
| 2007/0182639 A1 | | 8/2007 | Sievenpiper et al. |
| 2008/0024368 A1 | | 1/2008 | Chang et al. |

(Continued)

FOREIGN PATENT DOCUMENTS

| | | |
|---|---|---|
| CN | 115020987 A | 9/2022 |
| CN | 115302906 A | 11/2022 |

(Continued)

OTHER PUBLICATIONS

Varittha Sanphuang, Nima Ghalichechian, Niru K. Nahar, John L. Volakis; Equivalent circuit for VO2 phase change material film in reconfigurable frequency selective surfaces. Appl. Phys. Lett. Dec. 21, 2015; 107 (25): 253106. https://doi.org/10.1063/1.4938468 (Year: 2015).*

(Continued)

*Primary Examiner* — Amal Patel
(74) *Attorney, Agent, or Firm* — Workman Nydegger

(57)　　　ABSTRACT

A reconfigurable intelligent surface is disclosed. The reconfigurable intelligent surface includes a switch layer that can transition to a metallic state from an insulator state and to the insulator state from the metallic state based on its temperature. A voltage is applied to the switch layer to control the temperature and control the state of the switch layer. Controlling the state of the switch layer allows the reconfigurable intelligent surface to operate in a transmission mode when the switch layer is in the insulator state and a reflection mode when the switch layer is in the metallic state.

16 Claims, 9 Drawing Sheets

(56) References Cited

U.S. PATENT DOCUMENTS

| | | | |
|---|---|---|---|
| 2016/0294054 A1 | 10/2016 | Behdad et al. |
| 2021/0143555 A1 | 5/2021 | Akselrod et al. |
| 2022/0278740 A1 | 9/2022 | Shahvirdi Dizaj Yekan et al. |
| 2023/0352834 A1 | 11/2023 | Gupta et al. |
| 2024/0072452 A1 | 2/2024 | Taravati et al. |
| 2024/0079792 A1 | 3/2024 | Hong et al. |
| 2024/0243473 A1 | 7/2024 | Lee et al. |
| 2024/0339754 A1 | 10/2024 | Tam et al. |
| 2025/0097754 A1 | 3/2025 | Li et al. |
| 2025/0309943 A1 | 10/2025 | Elshafie et al. |
| 2026/0074842 A1 | 3/2026 | Na et al. |

FOREIGN PATENT DOCUMENTS

| | | |
|---|---|---|
| CN | 116470296 A | 7/2023 |
| CN | 116567860 A | 8/2023 |
| KR | 10-2018-0076359 A | 7/2018 |
| WO | 2022/253534 A1 | 12/2022 |

OTHER PUBLICATIONS

International Search Report and Written Opinion received for PCT Patent Application No. PCT/US24/13824, mailed on Sep. 5, 2024 18 pages.

International Search Report and Written Opinion received for PCT Patent Application No. PCT/US24/13832, mailed on Aug. 16, 2024, 13 pages.

International Search Report and Written Opinion received for PCT Patent Application No. PCT/US24/13690, mailed on Aug. 22, 2024, 14 pages.

International Search Report and Written Opinion received for PCT Patent Application No. PCT/US24/13837, mailed on Aug. 9, 2024, 15 pages.

Karnati et al., "A Monolithically BST-Integrated Ka-Band Beamsteerable Reflectarray Antenna," IEEE Transactions on Antennas and Propagation, vol. 65, No. 1, Nov. 9, 2016, pp. 159-166.

Morgan. et al., "Metasurface with reconfigurable reflection phase for high-power microwave applications," IEEE Antennas and Propagation Society International Symposium (APSURSI). IEEE, 2014, pp. 1230-1231.

Rodrigues. et al., "Optimized phase shifts in intelligent reflective surfaces for robust radar-based indoor coverage enhancement," Radar Sensor Technology XXVII., vol. 12535, SPIE, 2023.

Singh. et al., "Chalcogenide GeTe-based non-volatile switched K-band tunable reflective load for reconfigurable RF circuits," IEEE/MTT-S International Microwave Symposium—IMS 2022. IEEE, 2022, pp. 967-970.

"Programmable terahertz chip-scale sensing interface with direct digital reconfiguration at sub-wavelength scales" (Year: 2019).

International Search Report and Written Opinion received for PCT Patent Application No. PCT/US2024/013793, mailed on Sep. 26, 2024, 19 pages.

Zheng et al., "Uplink Channel Estimation for Double-IRS Assisted Multi-User MIMO", ICC 2021—IEEE International Conference on Communications, 2021, pp. 1-6.

Agrawal et al., Finite Block Length Analysis of RIS-Assisted UAV-Based Multiuser IoT Communication System With Non-Linear EH, May 1, 2022, IEEE Transactions on Communications, 3542-3557, 70/5.

Amri, et al., "A Programmable Binary Metasurface for Wireless Power Transfer Application," 2020 IEEE Wireless Power Transfer Conference (WPTC), Seoul, Korea (South), Nov. 2020.

Bahl et al., Amorphous versus crystalline GeTe films. III. Electrical properties and band structure, Apr. 1, 1970, J. Appl. Phys., 2196-2212, 41/5.

Baladi et al., Dual-Band Circularly Polarized Fully Reconfigurable Reflectarray Antenna for Satellite Applications in the Ku-Band, Dec. 1, 2021, IEEE Transactions of Antennas and Propagation, 8387-8396, 69/12.

Basharat et al., Reconfigurable Intelligent Surfaces: Potentials, Applications, and Challenges for 6G Wireless Networks, Jul. 12, 2021, IEEE Wireless Commun., 184-191, 28/6.

C. Guclu, J. Perruisseau-Carrier et al., "Proof of concept of a dual-band circularly-polarized RF MEMS beam-switching reflectarray," IEEE Transactions on Antennas and Propagation, vol. 60, No. 11, pp. 5451-5455, Nov. 2012.

Chen et al., "Ultra-wideband/short-pulse radar for target identification and detection-laboratory study," Proc. International Radar Conference, Alexandria, VA, USA, 1995.

Chen et al., Reconfigurable Intelligent Surfaces for 6G IoT Wireless Positioning: A Contemporary Survey, Dec. 1, 2022, IEEE Internet of Things J., 23570-23582, 9/23.

D. F. Sievenpiper, J. H. Schaffner et al., "Two-dimensional beam steering using an electrically tunable impedance surface," IEEE Transactions on Antennas and Propagation, vol. 51, No. 10, pp. 2713-2722, Oct. 2003.

Dai et al., Reconfigurable Intelligent Surface-Based Wireless Communications: Antenna Design, Prototyping, and Experimental Results, Dec. 8, 2019, IEEE Access, 45913-45923, 8.

Dash et al., Active Control of THz Waves in Wireless Environments Using Graphene-Based RIS, Oct. 1, 2022, IEEE Transactions on Antennas and Propagation, 8785-8797, 70/10.

Gidlund, T. Lennvall and J. Akerberg, "Will 5G become yet another wireless technology for industrial automation?," in IEEE International Conference on Industrial Technology (ICIT), pp. 1319-1324, Toronto, Canada, 2017.

Haake et al., "Problems caused by insufficient electrical isolation in RF-measurement setups," 2005 International Symposium on Electromagnetic Compatibility (EMC 2005)., Chicago, IL, USA, 2005, pp. 256-261 vol. 1, doi: 10.1109/ISEMC.2005.1513510.

Huang et al., Reconfigurable metasurface for multifunctional control of electromagnetic waves, Sep. 29, 2017, Advanced Optical Materials, 5/22.

Huang et al., The state-of-the-art of RF capacitive tunable components (Invited), Nov. 1, 2010, 2010 10th IEEE International Conference on Solid-State and Integrated Circuit Technology, Shanghai, China, 619-622.

J.-B. Gros, V. Popov et al., "A Reconfigurable Intelligent Surface at mmWave Based on a Binary Phase Tunable Metasurface," IEEE Open Journal of the Communications Society, vol. 2, pp. 1055-1064, 2021.

Jia et al., Beam Scanning for Dual-Polarized Antenna With Active Reflection Metasurface, May 20, 2022, IEEE Antennas and Wireless Propagation Letters, 1722-1726, 21/9.

Kaina et al., Shaping complex microwave fields in reverberating media with binary tunable metasurfaces, Oct. 21, 2014, Scientific Reports, 1-7, 4.

Kim et al., Independently Polarization Manipulable Liquid-Crystal-Based Reflective Metasurface for 5G Reflectarray and Reconfigurable Intelligent Surface, Jun. 1, 2023, IEEE Transactions on Antennas and Propagation.

M. Di Renzo, A. Zappone et al., "Smart Radio Environments Empowered by Reconfigurable Intelligent Surfaces: How it Works, State of Research, and The Road Ahead," IEEE Journal on Selected Areas in Communications, vol. 38, No. 11, pp. 2450-2525, Nov. 2020.

M. F. Jager, C. Ott, P. M. Kraus et al., "Tracking the insulator-to-metal phase transition in VO2 with few-femtosecond extreme UV transient absorption spectroscopy," in Proceedings of the National Academy of Sciences, vol. 114, No. 36, pp. 9558-9563, Sep. 2017.

M. Ojaroudi and V. Loscri, "Graphene-Based Reconfigurable Intelligent Meta-Surface Structure for THz Communications," 15th European Conference on Antennas and Propagation (EUCAP), pp. 1-5, Germany 2021.

M. Poulakis, "Metamaterials Could Solve One of 6G's Big Problems [Industry View]," in Proceedings of the IEEE, vol. 110, No. 9, pp. 1151-1158, Sep. 2022.

Momeni et al., K/Ka-Band Full-Duplex Satcom ESA Using a Varactor-Based Metasurface Aperture, Mar. 26, 2023, 2023 17th European Conference on Antennas and Propagation (EuCAP), Florence, Italy, 1-4.

(56) References Cited

OTHER PUBLICATIONS

Nardone et al., Electrical conduction in chalcogenide glasses of phase change memory, Oct. 1, 2012, J. Appl. Phys., 112/071101.

Ovshinsky, S. R., Reversible electrical switching phenomena in disordered structures, Nov. 11, 1968, Phys. Rev. Lett., 1450-1453, 21/20.

PI (Physik Instruments) L.P., PI P-088 Round PICMA Stack Multilayer Piezo Actuator, https://www.pi-usa.us/en/products/piezo-actuators-stacks-benders-tubes/p-088-round-picma-stack-multilayer-piezo-actuator-100821, Aug. 1, 2023.

PI (Physik Instruments) L.P., PI P-216 PICA Power Piezo Actuators, https://www.pi-usa.us/en/products/piezo-actuators-stacks-benders-tubes/p-216-pica-power-piezo-actuator-101555, Aug. 1, 2023.

Q. Hu, X. Zeng et al., "Design of a Novel 2-bit Wideband Beam-Scanning Reconfigurable Intelligent Surface," IEEE International Workshop on Electromagnetics: Applications and Student Innovation Competition (iWEM), pp. 1-3, China 2021.

Qiu et al., Flexible Controls of Radar Cross Section based on Coding Metasurface with Varactors, Jul. 18, 2019, 2019 Cross Strait Quad-Regional Radio Science and Wireless Technology Conference (CSQRWC), Taiyuan, China, 1-2.

Quevedo-Teruel et al., Roadmap on metasurfaces, Jul. 1, 2019, Journal of Optics, 073002, 21/7.

Rahman et al., White Paper: 5G Advanced: Evolution towards 6G, Jun. 1, 2023, BNEW-22:024836 Uen, https://www.ericsson.com/en/reports-and-papers/white-papers/5g-advanced-evolution-towards-6g.

S. Rangan, T. S. Rappaport et al., "Millimeter-Wave Cellular Wireless Networks: Potentials and Challenges," Proceedings of the IEEE, vol. 102, No. 3, pp. 366-385, Mar. 2014.

Schmitt et al., Design and Fabrication of MEMS Reflectors for THz Reflect-Arrays, Jul. 5, 2021, Fourth International Workshop on Mobile Terahertz Systems (IWMTS), 1-5.

Singh et al., Experimental Investigation of Performance, Reliability, and Cycle Endurance of Nonvolatile DC-67 Ghz Phase-Change RF Switches, Nov. 1, 2021, IEEE Transactions on Microwave Theory and Techniques, 4697-4710, 69/11.

Singh, et al., "Recent Advancements in Reconfigurable mmWave Devices Based on Phase-Change and Metal Insulator Transition Materials," IEEE J. Microw., vol. 3, No. 2, pp. 827-851, Apr. 2023.

Skyworks, Data sheet SMV1405 to SMV1430 series: Plastic-packaged Abrupt Junction Tuning Varactors, Jan. 25, 2016, https://www.skyworksinc.com/-/media/SkyWorks/Documents/Products/101-200/SMV1405_1430_Series_200068W.pdf, Jun. 23, 2023.

Skyworks, Data Sheet: SMV1493, SMV1494: Silicon Abrupt Junction Tuning Varactors, Hermetic Ceramic Packaged Devices, https://www.skyworksinc.com/-/media/SkyWorks/Documents/Products/2601-2700/SMV1493_SMV1494_203255C.pdf, Jun. 23, 2023.

Skyworks, Preliminary Data Sheet MV2025 hyperabrupt tuning varactors supplied on film frame and Waffle Packs, Jun. 27, 2013, https://www.skyworksinc.com/-/media/SkyWorks/Documents/Products/1801-1900/SMV2025_202913A.pdf, Jun. 23, 2023.

Subrt et al., Controlling Propagation Environments Using Intelligent Walls, Mar. 1, 2012, 6th European Conference on Antennas and Propagation (EUCAP).

Trivedi et al., Hyperabrupt-junction varactor for mmWave SiGe:C BiCMOS, enabling 77GHz VCO/TX with 13-15GHz tuning range, Oct. 4, 2010, 2010 IEEE Bipolar/BiCMOS Circuits and Technology Meeting (BCTM), Austin, TX, 82-85.

V. Ziegler, H. Viswanathan, H. Flinck et al., "6G Architecture to Connect the Worlds," in IEEE Access, vol. 8, pp. 173508-173520, Sep. 2020.

Viswanathan et al., White Paper: Communications in the 6G Era, Mar. 1, 2020, Nokia Bell Labs.

X. Meng, M. Nekovee and D. Wu, "The Design and Analysis of Electronically Reconfigurable Liquid Crystal-Based Reflectarray Metasurface for 6G Beamforming, Beamsteering, and Beamsplitting," IEEE Access, vol. 9, pp. 155564-155575, 2021.

Zhang, Zhang, Y. Zhang, J. Cosmas et al., "mmWave Indoor Channel Measurement Campaign for 5G New Radio Indoor Broadcasting", in IEEE Transactions on Broadcasting, vol. 68, No. 2, pp. 331-344, Jun. 2022.

International Search Report and Written Opinion received for PCT Patent Application No. PCT/US24/13685, mailed on Aug. 2, 2024, 16 pages.

Mavridou et al, "Continuously Tunable mm-Wave High Impedance Surface", IEEE Antennas and Wireless Propagation Letters, vol. 15, Apr. 20, 2016, pp. 1390-1393.

Vassos et al, "Design Process of Novel Electro-Mechanically Tuneable Reflectarray Antennas", 2021 51st European Microwave Conference (EUMC), European Microwave Association, Apr. 4, 2022, pp. 155-157.

Mavridou, M., Feresidis, A.P., Gardner, P. and Hall, P. S., 2014. Tunable millimetre-wave phase shifting surfaces using piezoelectric actuators. IET Microwaves, Antennas & Propagation, 8(11), pp. 829-834.

Squeeze-Film Damping of Perforated Plates, Created in COMSOL Multiphysics 5. Nov. 6, 11,2020.

Tsilipakos, 0., Tasolamprou, A.C., Pitilakis, A., Liu, F., Wang, X., Mirmoosa, M.S., Tzarouchis, D.C., Abadal, S., Taghvaee, H., Liaskos, C. and Tsioliaridou, A., 2020. Toward intelligent metasurfaces: the progress from globally tunable metasurfaces to software-defined metasurfaces with an embedded network of cont.

Vassos, E., Churm, J. and Feresidis, A., 2020. Ultra-low-loss tunable piezoelectric-actuated metasurfaces achieving 360° or 180° dynamic phase shift at millimeter-waves. Scientific Reports, 10(1), p. 15679.

* cited by examiner

| | | |
|---|---|---|
| ——— $s_2$ = 0.8 mm | ········ $s_2$ = 2.0 mm | — ·· — $s_2$ = 2.8 mm |
| — — — $s_2$ = 1.2 mm | ——— $s_2$ = 2.4 mm | — — · $s_2$ = 3.2 mm |
| ——— ·· $s_2$ = 1.6 mm | | |

| | | |
|---|---|---|
| ——— $s_2$ = 0.8 mm | ········ $s_2$ = 2.0 mm | — ·· — $s_2$ = 2.8 mm |
| — — — $s_2$ = 1.2 mm | ——— $s_2$ = 2.4 mm | — — · $s_2$ = 3.2 mm |
| ——— ·· $s_2$ = 1.6 mm | | |

1000

| Storage Media 1008 |
| UI Device 1110 |
| Data Storage 1112 |

| Memory 1002 |
| NVRAM 1004 |
| Processor 1006 |
| Application(s) 1014 |

RECONFIGURABLE INTELLIGENT SURFACES WITH DUAL MODE SIGNAL PROPAGATION IN TRANSMISSION AND REFLECTION SPACE

FIELD OF THE INVENTION

Embodiments of the present invention generally relate to reconfigurable intelligent surfaces. More particularly, at least some embodiments of the invention relate to systems, hardware, software, computer-readable media, and methods for reconfigurable surfaces for reflecting and/or transmitting incident signals.

BACKGROUND

Cellular wireless communication is primarily based on 5G technology. 5G wireless networks are generally intended to deliver Gigabit data speeds, very low latencies, and a better user experience. These goals have been generally achieved. The telecom industry, however, is working to deliver sixth generation (6G) wireless communications.

Advancing to 6G wireless communication will have rigorous requirements, including extraordinarily high spectrum and energy efficiency, microsecond latency, and full-dimensional network coverage. Current communication technologies, such as ultra-massive multiple-input multiple-output (UM-MIMO) and ultra-dense networks (UDNs), are being expanded to meet these objectives.

However, these enhancements are not without their challenges. The escalation in the quantity of antennas/base stations and usage of high carrier frequencies can potentially lead to increased energy consumption and hardware costs due to the need for more power-hungry and costly radio frequency (RF) chains. Additionally, the introduction of numerous active components operating at high frequencies can create complex interference scenarios, pilot contamination, and significant hardware impairments.

To counter these issues, the development of cost-effective strategies for wireless communication systems is imperative and reconfigurable intelligent surfaces (RISs) are being viewed as potential solutions.

Conventional reconfigurable intelligent surfaces primarily focus on surfaces that reflect incident signals. As a result, both the source of a signal and the target of the signal need to be on the same side of the reconfigurable intelligent surface, which limits the flexibility of the reconfigurable intelligent surface. Purely reflecting reconfigurable intelligent surfaces primarily function as passive relay nodes that adjust the direction of incident wireless signals, thus improving the performance of wireless communication systems. While reconfigurable intelligent surfaces have significant advantages, one limitation is their topological constraint. Because they only reflect the incident signal, the source (e.g., access point or base station) and the destination (e.g., user equipment) must be on the same side of the reconfigurable intelligent surface. This constraint reduces the flexibility of deploying these surfaces in various real-world scenarios where the transmitter and receiver may not be located on the same side of the reconfigurable intelligent surfaces. Further, conventional reconfigurable intelligent surfaces are unable to provide continuous beam steering.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to reconfigurable intelligent surfaces. More particularly, at least some embodiments of the invention relate to systems, hardware, software, computer-readable media, and methods for selectively reflecting or transmitting a signal incident on the reconfigurable intelligent surface.

Embodiments of the invention further relate to a reconfigurable intelligent surface that is capable of both transmitting and reflecting wireless signals. Reconfigurable intelligent surfaces in accordance with embodiments of the invention can operate as a relay node that transmits signals to the other side of the reconfigurable intelligent surface or a reflection node. This provides greater flexibility in deploying reconfigurable intelligent surfaces and in expanding their potential applications.

A reconfigurable intelligent surface is an engineered two-dimensional surface outfitted with a passive elements or unit cells and may include metamaterials. A panel that includes a grid or arrangement of unit cells is an example of a reconfigurable intelligent surface. A reconfigurable intelligent surface functions by manipulating a phase response of each unit cell. This adjusts the propagation of incident wireless signals and enables smart radio environments (SREs).

Embodiments of the invention more specifically relate to a reconfigurable intelligent surface that is capable of either reflecting or transmitting wireless signals (electromagnetic waves). Reconfigurable intelligent surfaces can dynamically switch between a transmission mode and a reflection mode, thereby providing reconfigurable 360° environment coverage. When operating in the reflection mode, the reconfigurable intelligent surface behaves like an RF (Radio Frequency) mirror that reflects the incoming beam back on the same side. When operating in a transmission mode, the reconfigurable intelligent surface operates as a lens, projecting the incoming beam with high directivity on the other side. A reconfigurable intelligent surface can be deployed or installed on surfaces such as windows where the radio coverage can be selectively enhanced on both sides of the surface or window.

Figure 1:
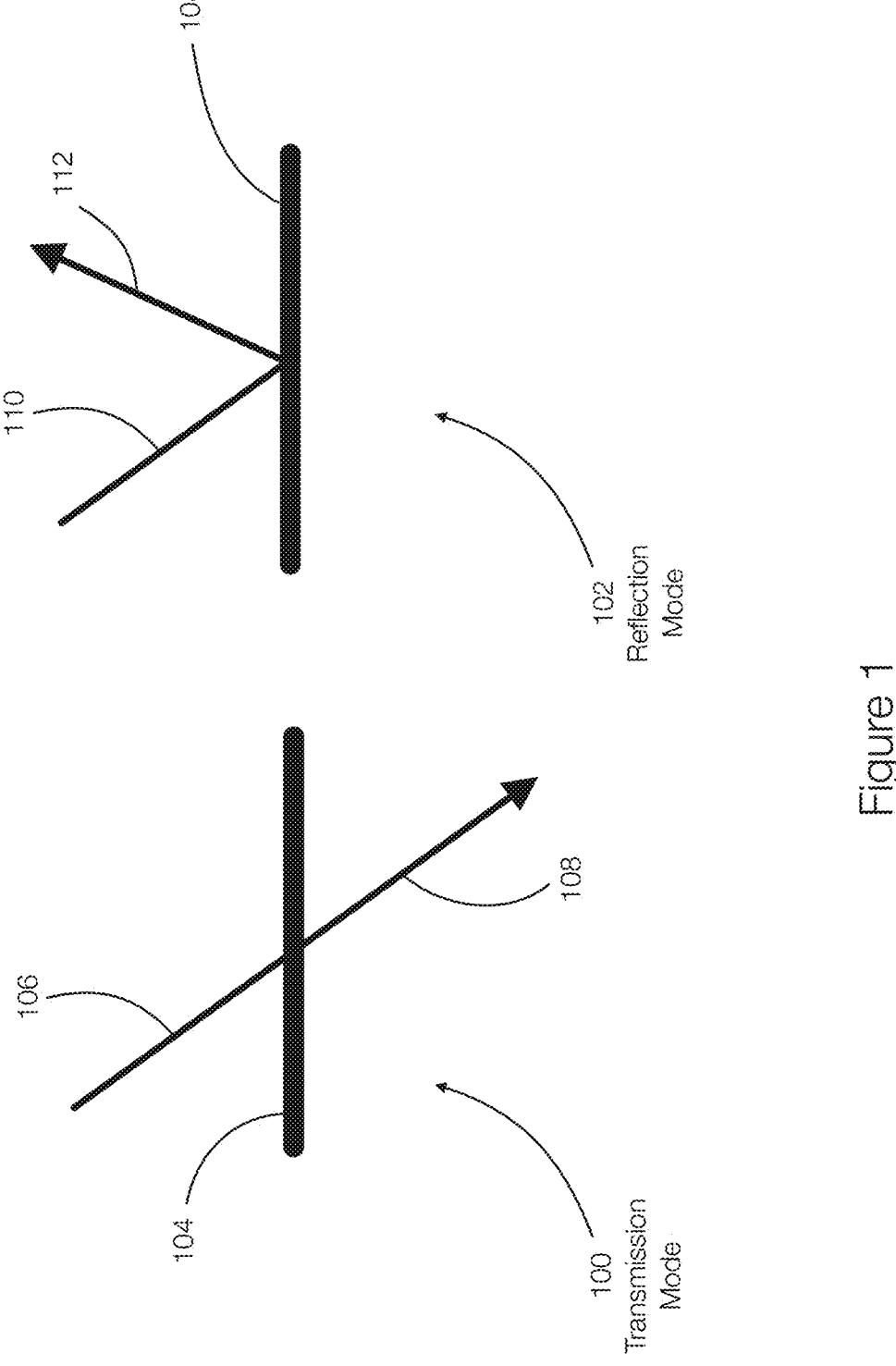
FIG. 1 discloses aspects of a reconfigurable intelligent surface that is capable of operating in a transmission mode and in a reflection mode.

FIG. 1 discloses aspects of a reconfigurable intelligent surface. FIG. 1 illustrates a reconfigurable intelligent surface 104 that is configured to operate in a transmission mode 100 or a reflection mode 102. In the transmission mode 102, an incident signal 106 is transmitted through and by the reconfigurable intelligent surface 104 as the signal 108. In the reflection mode 102, the incident signal 110 is reflected as the signal 112 by the reconfigurable intelligent surface 104.

Reconfigurable intelligent surfaces are typically structures that include numerous elements/unit cells. Because reconfigurable intelligent surfaces do not require radio frequency (RF) chains, they present a more economical and environmentally friendly alternative to traditional multi-antenna and relaying technologies. Embodiments of the invention relate to a reconfigurable intelligent surface that includes a switch layer that allows the reconfigurable intelligent surface to switch from the transmission mode to the reflection mode and from the reflection mode to the transmission mode.

Generally, the switch layer includes a material configured to transition from a metallic state to an insulator state and from the insulator state to the metallic state. The transition may occur based on the temperature of the material. The temperature may be changed using electric energy-such as by applying a voltage to change the temperature of the material. In one example, the switch layer includes a layer of vanadium dioxide ($VO_2$). This material, $VO_2$, undergoes a phase change from a metallic state to an insulator state depending on a temperature of the material. The switch layer can be heated using, in one example, electric energy (e.g., an applied voltage). By controlling the external voltage to control the temperature of the switch layer, the reconfigurable intelligent surface can dynamically switch between a transmission mode (when $VO_2$ is in insulator state) and a reflection mode (when $VO_2$ is in metallic state) in real-time.

In the transmission mode, the reconfigurable intelligent surface emulates a lens, directing the incoming beam with high precision to the other side. In the reflection mode, the reconfigurable intelligent surface emulates an RF mirror, redirecting the incoming beam with high directivity to the same side in a reflection direction.

In the transmission mode, functionally comparable to an optical lens, the reconfigurable intelligent surface modifies the phase shift of different lens portions when transmitting, thereby collimating an incident wave. In the reflection mode, the reflected signal from each element/unit cell is offered a certain phase shift such that a constructive interference leads the reflected beam at the desired angle to the incoming beam.

To allow for arbitrary phases on the aperture, a minimum phase range of 360° can be provided by each unit cell. The change in reflection phase from each unit cell is achieved by making dimensional changes to the unit cell geometry. In one example, the unit cells are arranged on the reconfigurable intelligent surface panel according to the desired phase profile such that a constructive reflected signal gain is achieved in the desired direction. Embodiments of the invention offer desirable characteristics such as a broad bandwidth, low reflection loss, low insertion loss, and a compact physical profile.

Figure 2A:
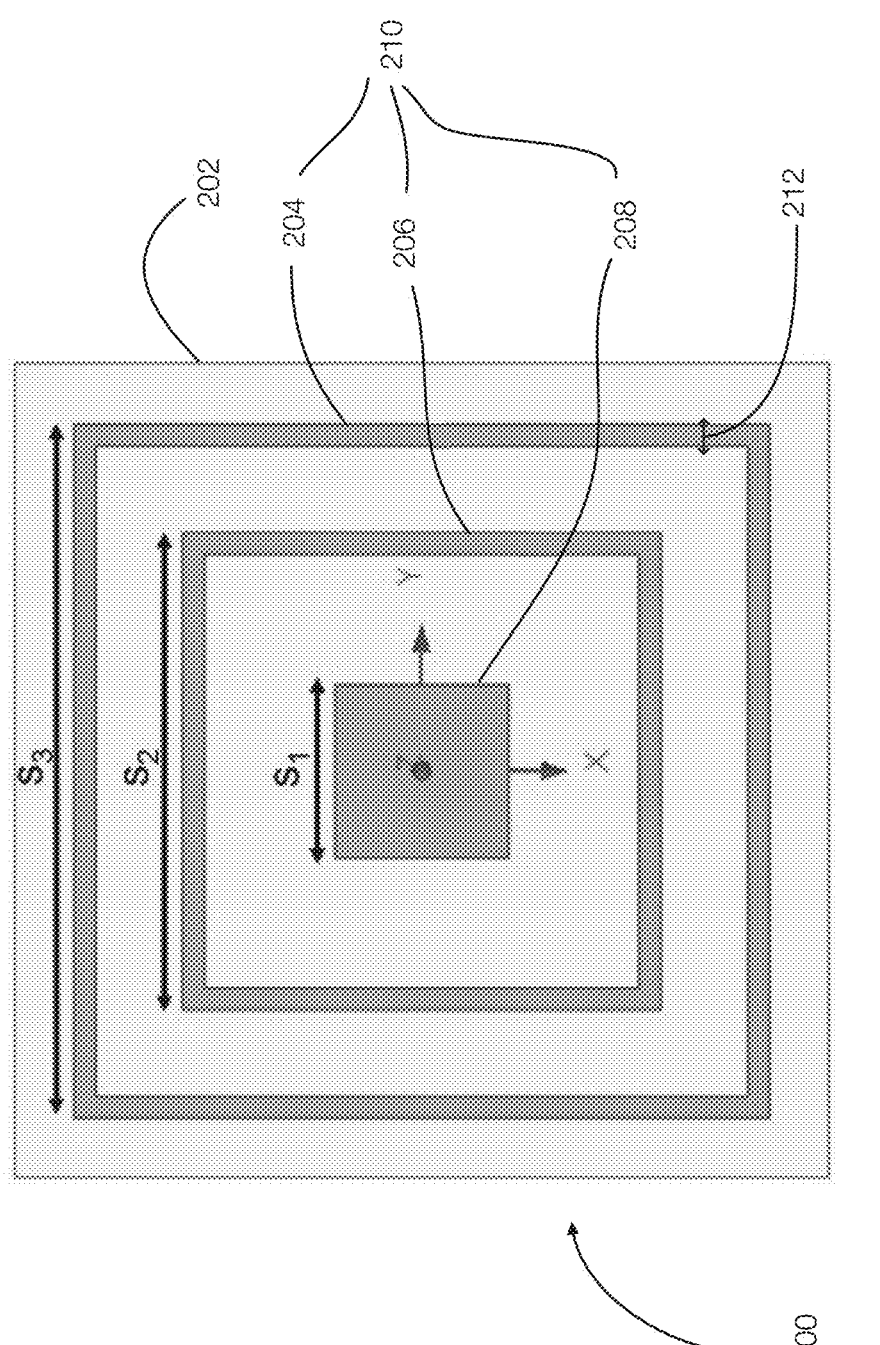
FIG. 2A discloses aspects of a top view of a unit cell of a reconfigurable intelligent surface that includes a patterned top layer.

FIG. 2A discloses aspects of a unit cell. A reconfigurable intelligent surface (e.g., a panel) may include a plurality of unit cells that are arranged in a grid or other pattern and that may be formed monolithically. FIG. 2A illustrates a metal pattern formed on a top surface of the unit cell 200. The pattern includes, by way of example only, a center portion 208 that is enclosed by a concentric rings 206 and 204. In this example, the center portion 208 has a square shape. The concentric rings 206 and 204 also have a square shape in this example. The center portion 208 and the concentric rings 206 and 204 are generally referred to as rings or a ring pattern 210. The configuration of the metal pattern of each unit cell may include any shape/number of discrete components as long as the pattern is resonant at the desired frequency of operation in one example. Thus, the metal pattern may include a concentric configuration, a solid shape (e.g., a cross or X shape) or the like.

The following example describes a particular pattern and illustrates how the pattern may be varied. This example is presented by way of example and not limitation. In one example, the dimensions of the outer ring 204 ($S_3$ by $S_3$) and the dimensions of the center portion 208 ($S_1$ by $S_1$) are constant. The dimensions of the inner or middle ring 206 ($S_2$ by $S_2$) in the unit cells of a panel may vary in different embodiments. Other embodiments allow for the dimensions of the center portion 208 and the rings 206 and 204 to be varied. More generally, the dimensions conform to the following condition: $S_1 \leq S_2 \leq S_3$, for any given embodiment. In addition, the thickness 212 of the rings 204 and 206 may also vary and may be the same or different.

Generally, the center portion 208 and the rings 206 and 204 are configured (e.g., sized, shaped, and positioned) to be resonant with a particular frequency or a range of frequencies. By way of example and not limitation, embodiments of the invention relate to the transmission and reflection of signals (electromagnetic radiation) in the range of 30 Giga-Hertz to 300 GigaHertz. In one example, the designs/patterns of the unit cells may be frequency independent and may depend on the size of the unit cell and the spacing between the unit cells. Thus, the design of the unit cell or of the reconfigurable intelligent surface can be scaled to operate at lower frequencies or at higher frequencies including TeraHertz frequencies.

Figure 2B:
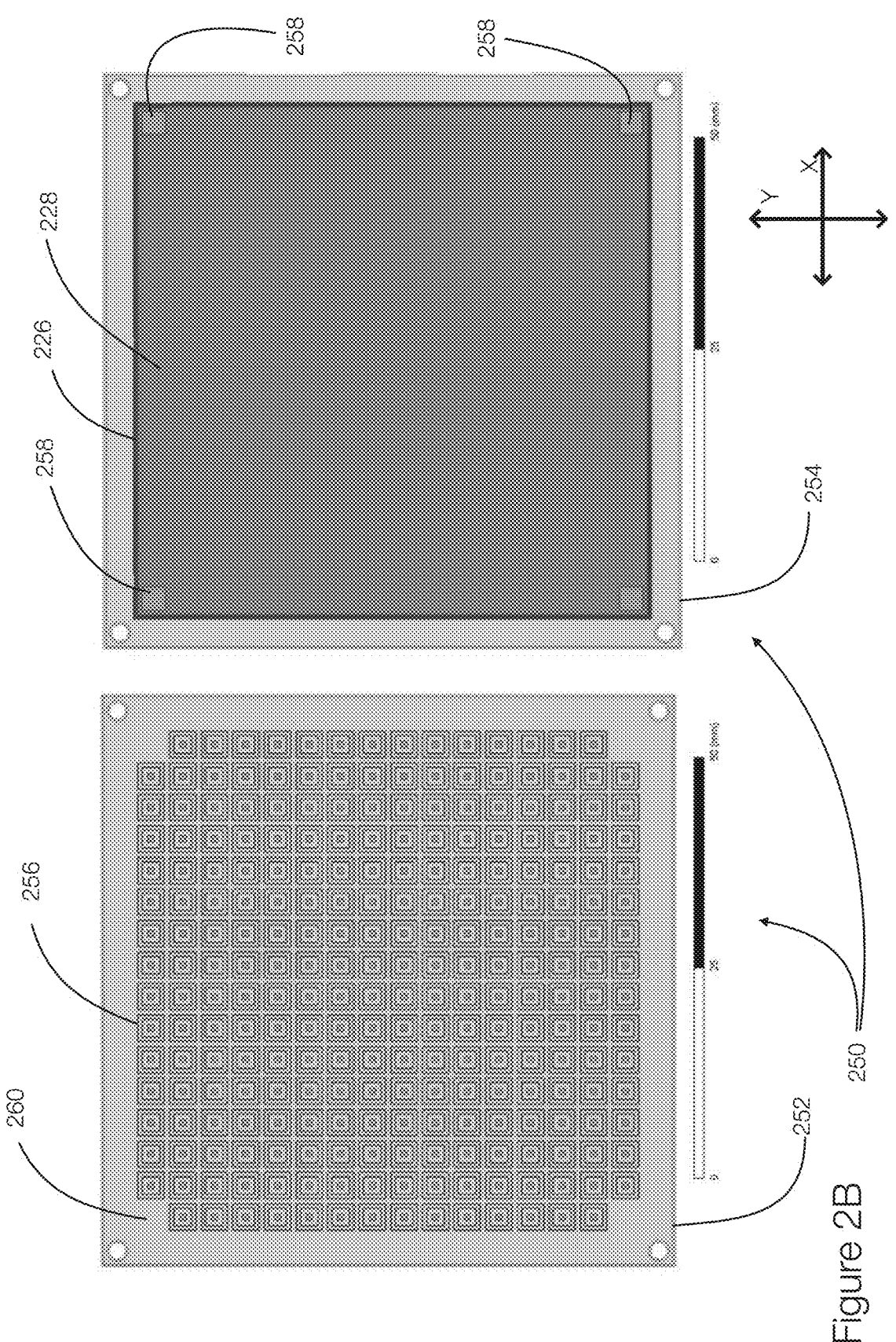
FIG. 2B discloses aspects of a panel that includes multiple unit cells.
Figure 2C:
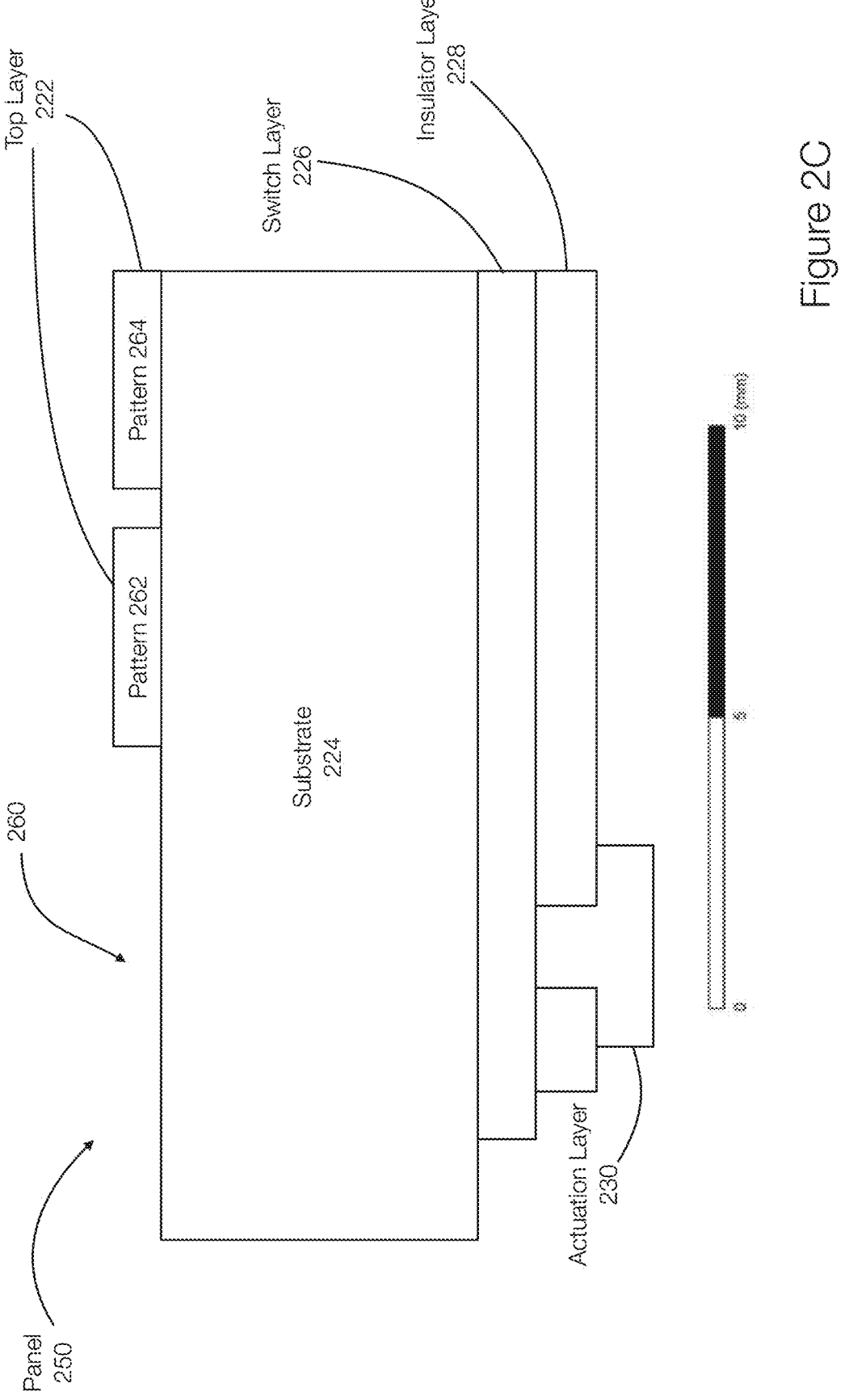
FIG. 2C discloses aspects of a partial cross sectional view of a part of the reconfigurable intelligent surface panel of FIG. 2B.

FIG. 2B discloses aspects of a panel that includes multiple unit cells. FIG. 2C more specifically illustrates a top view 252 and a bottom view 254 of a panel 250. The panel 250 include multiple unit cells, such as the unit cell 256, arranged in a pattern. The pattern of the unit cells in the panel 250 is typically grid shaped. However, the pattern of the unit cells can vary.

The panel 250 may be formed monolithically or integrated heterogeneously. As a result, the top metal layers of each of the individual cells are physically separated from each other. The patterns in the top metal layers of the unit cells may be the same or may be different. The dimensions of the patterns may vary in order to achieve a particular response (e.g., reflect in a certain direction or phase).

The bottom view 254 (FIG. 2B) illustrates the activation contact points 258, which are connected with the switch layer 226 through the insulator layer 228. The activation contact points 258, more specifically, are configured to pass through the insulator layer 228 and be in physical and electrical contact with the switch layer 226. As illustrated, the dimensions of the switch layer 226 are larger than the dimensions of the insulator layer 228 in the X and Y directions.

In this example, the panel 250 includes four contact points 258. By applying a voltage to the contact points in a manner that places the voltage across the switch layer 226, the voltage causes a temperature of the switch layer 226 to increase. Controlling the temperature of the switch layer 226 allows the switch layer 226 to switch from a metallic state to an insulator state or vice versa. Stated differently, the panel 250 is placed in a reflection mode when the switch layer 226 is in a conductive or a metallic state. The panel 250 is placed in a transmission mode when the switch layer 226 is placed in an insulator state.

The voltage can be controlled to operate the panel 250 as needed. For example, a voltage may be applied to the switch layer 226 using the contact points 258. The voltage can be applied continuously, according to a duty cycle, or the like. If the temperature of the switch layer 226 is measured, the voltage can be applied as needed to keep the switch layer 226 at or above the temperature required for the switch layer 226 to be in the metallic state. Removing the voltage allows the temperature of the switch layer to drop and the switch layer changes to the insulator state.

In one example, the panel 250 may be connected with a controller (e.g., a computing device or system) that allows the panel 250 to be controlled and operate in the metallic state or in the insulator state. The panel 250 may also include or be configured to connected with a power or voltage source. If the controller is remote, multiple panels in an environment can be controlled by the same controller or server.

FIG. 2C further illustrates that a metal patterns for unit cells corresponding to the location 260 corresponding to the contact or activation pads 258 are not present in the array of unit cells in the panel 250 in one example. Stated differently, the locations 260 are not unit cells of the panel 250. FIG. 2B illustrates in the top view 252 that the locations 260 do not have a metal pattern and are opposite the contacts 258.

FIG. 2C discloses aspects of a partial cross sectional view of the panel 250 shown in FIG. 2B. The view 250 may be a monolithic structure that is fabricated in layers. In this example, the view 250 illustrates a substrate 224. A switch layer 226 is formed on a bottom surface of the substrate 224 and a top layer 222 is formed on a top surface of the substrate 224. The top layer 222 in this example of the view 250 illustrates the patterns 262 and 264 of two individual unit cells. The patterns 262 and 262, which are examples of the pattern 210, may be the same or different and are isolated from each other. Because the view 250 is shown with respect to a contact point of the actuation layer 230, no top layer 222 or metallic pattern is present on the substrate 224 above the actuation layer 230 in one embodiment. An insulator layer 228 is formed on a bottom surface of the switch layer 226. An actuation layer 230 is formed on a portion of the insulator layer 228. The insulator layer 228 is etched or patterned such that the actuation layer 230, when formed, passes through the insulator layer 228 and is in contact (e.g., electrical contact point) with the switch layer 226 at specified locations.

In one example, the substrate 224 is silicon or FR4. Other substrates include, but are not limited to, glass, sapphire, quartz, rogers RF or the like. In one example, the substrate includes a dielectric material. The switch layer 226 is a thin layer of, by way of example, vanadium dioxide ($VO_2$). The top layer 222 and the actuation layer 230 may be formed of copper or other suitable metal or suitably conductive material.

In one example, embodiments of the invention are illustrated experimentally. In one example, a three dimensional model for the unit cell was generated and full wave EM (electromagnetic) simulations were performed using a commercial finite element modeler electromagnetic simulation application. To simulate the unit cell, specific boundary conditions are defined. The boundary conditions are derived from two sets of lattice pairs. A lattice in this context refers to the organized structure in which the unit cells are arranged. By introducing these lattice pairs, an infinite grid of unit cells in both X and Y directions may be emulated.

In practical terms, this indicates that when a single unit cell is simulated, the single unit cell is considered as if the unit cell were part of an endlessly repeating array in both the X and Y axes. This assumption allows the properties and behavior of the unit cell to predict the behavior of the entire panel. Under these conditions, the responses of the unit cell will accurately reflect the behavior of the unit cell within the larger array and allows for a detailed analysis of how variations in unit cell design may impact the performance of the panel as a whole.

Generally, the reflection and transmission characteristics of the unit cell allow the manner in which the panel or the reconfigurable intelligent surface interfaces with electromagnetic waves to be understood. These properties are examined utilizing two Floquet ports. Floquet ports allow the behavior of waves when the waves interact with the infinitely repeated structure to be simulated.

Figure 3:
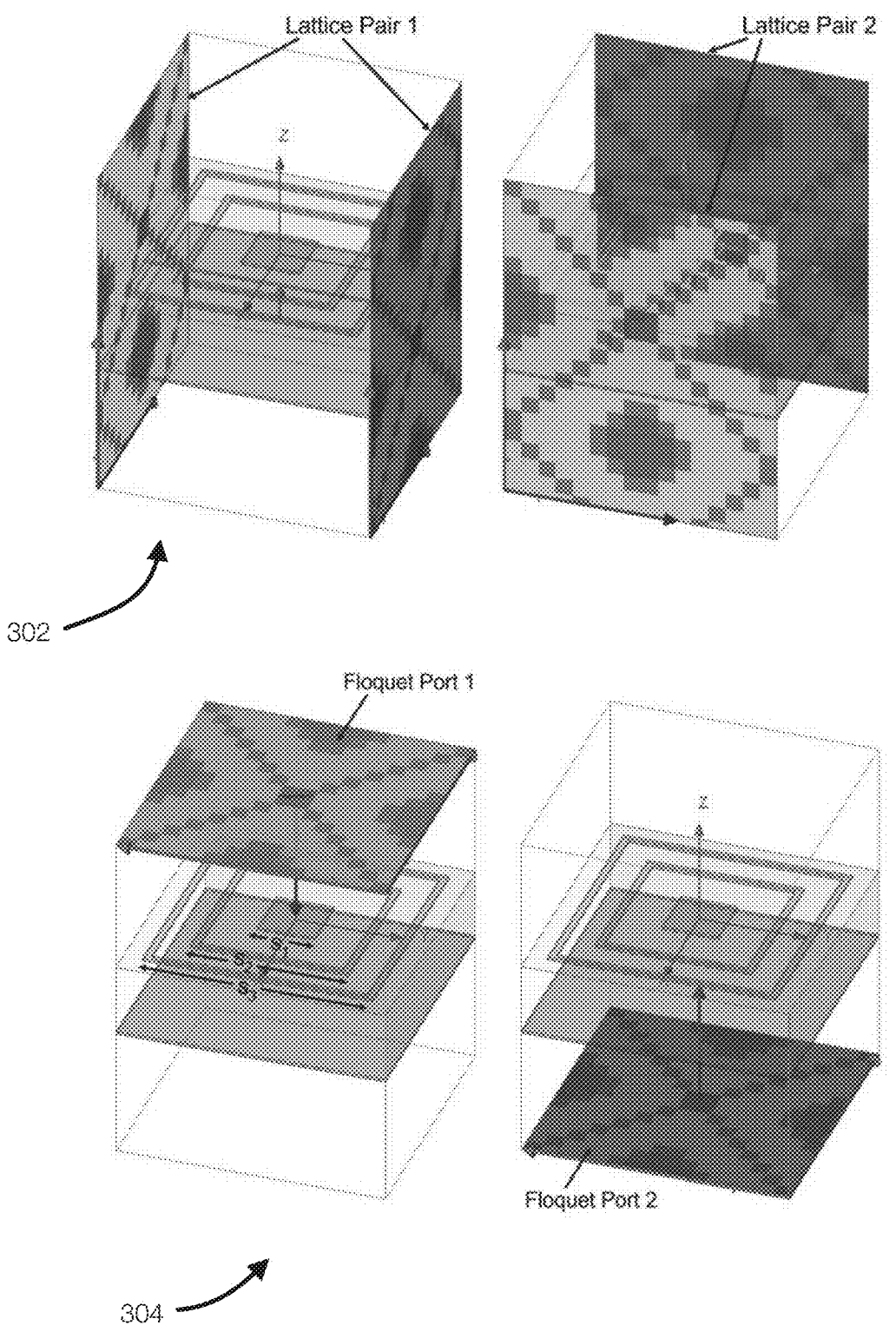
FIG. 3 discloses aspects of emulating a unit cell using lattice pairs and Floquet ports.

FIG. 3 discloses aspects of lattice pairs and Floquet ports. FIG. 3 illustrates lattice pairs 302 (e.g., lattice pairs 1 and 2) and Floquet ports 304 (ports 1 and 2). The first lattice pair are place on opposite sides of the unit cell in the X direction and the second lattice pair are placed on opposite sides of the unit cell in the Y direction. The Floquet ports 304 are placed on opposite sides of the unit cell in the Z direction or the reflection/transmission sides of the unit cell.

When an electromagnetic (EM) wave is incident upon a unit cell, part of the EM wave is reflected gets reflected (bounces back), and part of the EM wave is transmitted (passes through). These behaviors are quantified as reflection and transmission coefficients, respectively, which are parameters in the design and analysis of reconfigurable intelligent surfaces.

Figure 4:
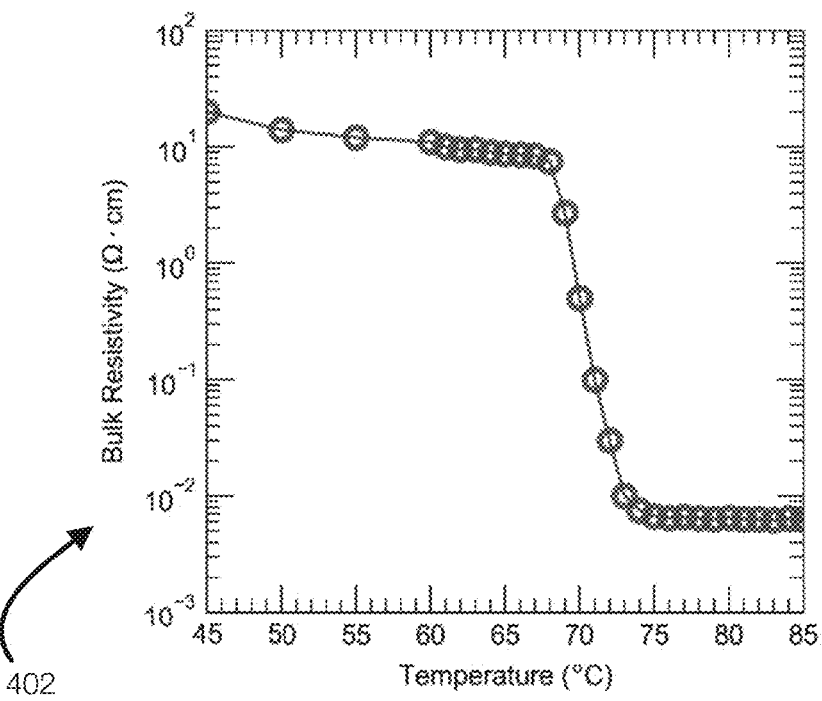
FIG. 4 discloses aspects of resistivity versus temperature for a unit cell that includes a switch layer formed from $VO_2$.

More specifically, the switch layer 226, in one example, includes $VO_2$ as previously discussed in one example embodiment. $VO_2$ is a material that exhibits a temperature-induced phase transition around 67° Celsius (or 152° F.) as shown in the graph 402 of FIG. 4. Below this temperature, $VO_2$ acts an insulator or is in an insulator state. As the temperature rises above this threshold, $VO_2$ transitions into a metallic state, thereby significantly altering its electrical and optical properties. As shown in the graph 402, a significant decrease in resistivity (thus an increase in conductivity) is achieved beyond a certain threshold of temperature. As previously described, by applying a voltage to the switch layer, an example of which is a $VO_2$ layer, the switch layer is heated and a phase transition occurs as illustrated in the graph 402.

When the switch layer 226 includes $VO_2$, the insulator to metallic phase transition may occur in under 100 femto seconds. Switching $VO_2$ from the metallic phase to the insulator phase requires less thermal energy and can be performed in under 50 femto seconds.

Figure 5:
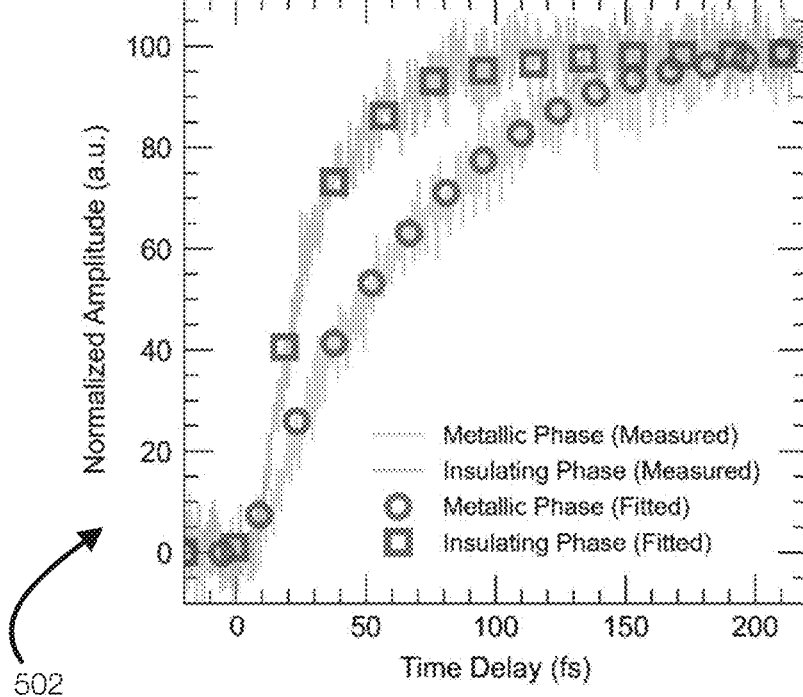
FIG. 5 discloses aspects of a time constant of a switch layer when transitioning from an insulator state to a metallic state or from the metallic state to the insulator state.

FIG. 5 discloses aspects of the phase transition from the insulator state to the metallic state for $VO_2$. The graph 502 illustrates a time constant of rise into the metallic phase and insulating phase for a switch layer such as $VO_2$.

Figure 6:
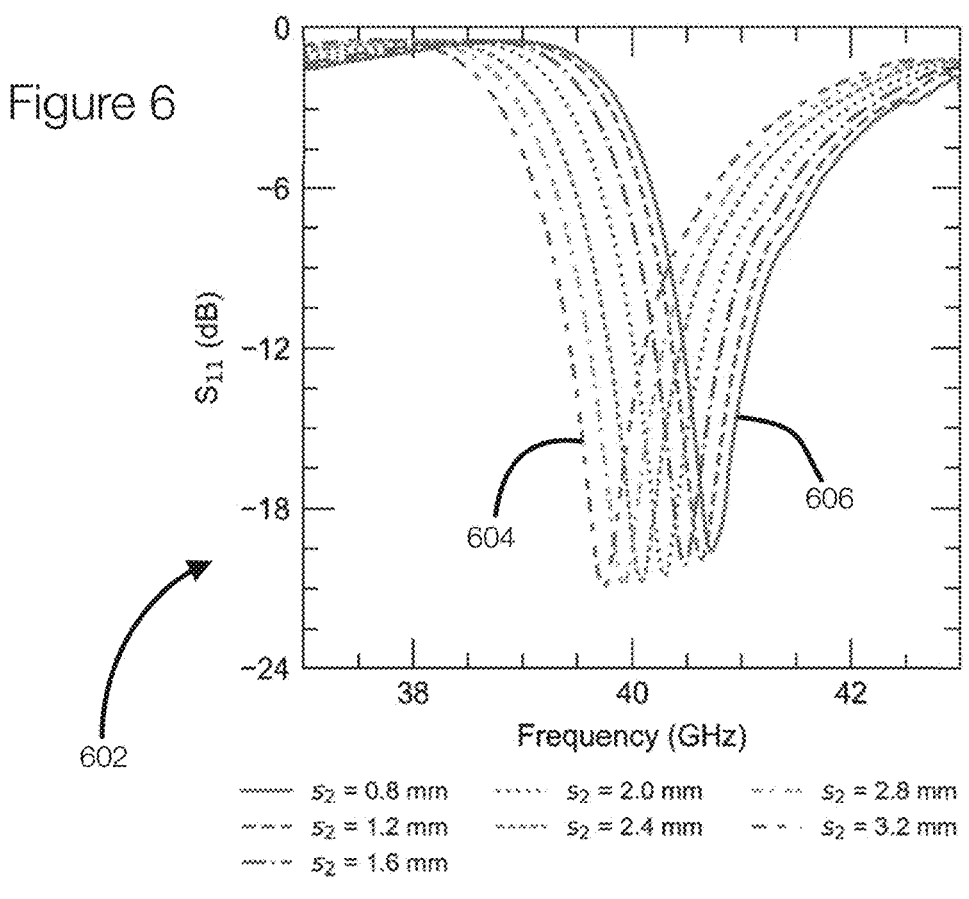
FIG. 6 discloses aspects of a simulated reflection magnitude of a unit cell at 40 Gigahertz for various dimensions (e.g., $S_2$ values) associated with a pattern of a unit cell's top metal layer.

FIG. 6 discloses aspects of a simulated reflection magnitude of a unit cell at 40 GHZ for different dimensions $S_2$ of the middle ring in the pattern of the unit cell's top layer. More specifically, when the $VO_2$ or the switch layer is in the metallic state, the unit cell reflects most of the EM signal incident on the unit cell at 40 GHz. The graph 602 illustrates an $S_{11}$ response (e.g., the input reflection coefficient) when the dimension $S_2$ of the middle ring (e.g., ring 206 in FIG. 2) varies from 0.8 mm to 3.2 mm in increments of 0.4 mm. The response 604 corresponds to an $S_2$ dimension of 3.2 mm and the response 606 corresponds to an $S_2$ dimension of 0.8 mm. The other curves in the graph 602 correspond to dimensions of $S_2$ between 0.8 and 3.2 mm.

Figure 7:
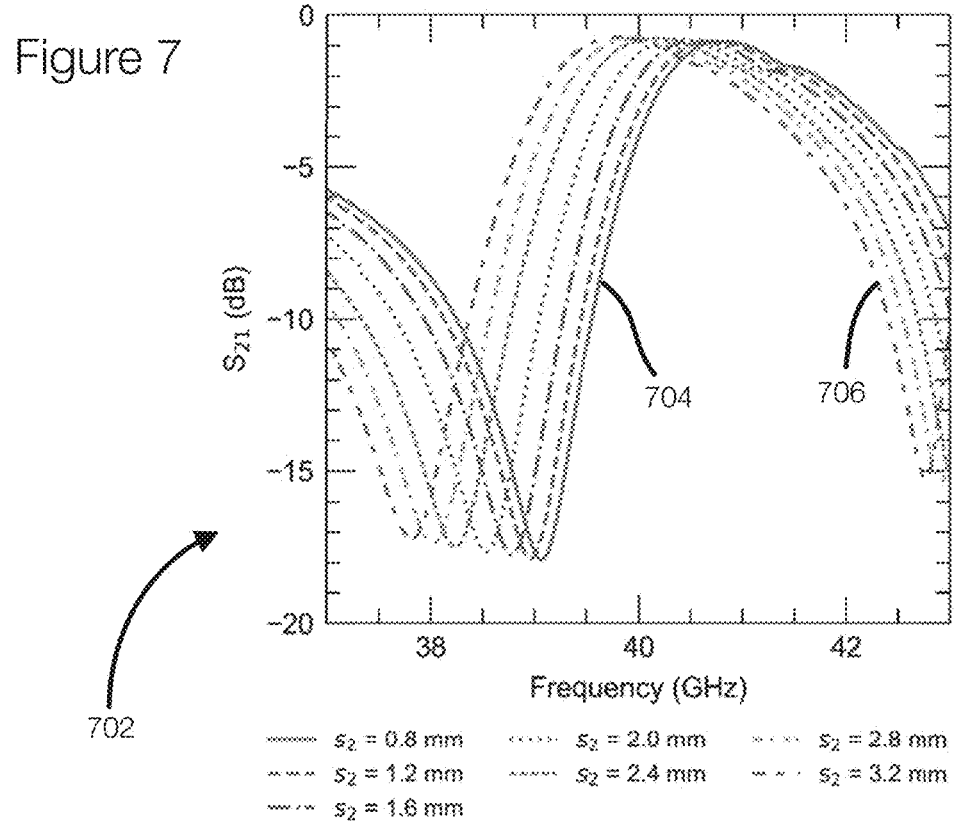
FIG. 7 discloses aspects of a simulated transmission magnitude of a unit cell at 40 GHz for different $S_2$ values.

FIG. 7 discloses aspects of a simulated transmission magnitude of a unit cell for 40 GHz for different dimensions $S_2$ of the middle ring in the pattern of the unit cell's top layer. When the $VO_2$ layer or switch layer is in the insulator state, the unit cell transmits most of the incident EM signal as shown in the magnitude of $S_{21}$ in FIG. 7 for the values of $S_2$ increasing from 0.8 mm to 3.2 mm. The response 704 corresponds to a response for an $S_2$ value of 0.8 mm and the response 706 corresponds to a response for an $S_2$ value of 3.2 mm. The other curves in the graph 702 correspond to dimensions of $S_2$ between 0.8 and 3.2 mm. The graph 702 illustrates a forward transmission coefficient for the S parameter $S_{21}$.

Figure 8:
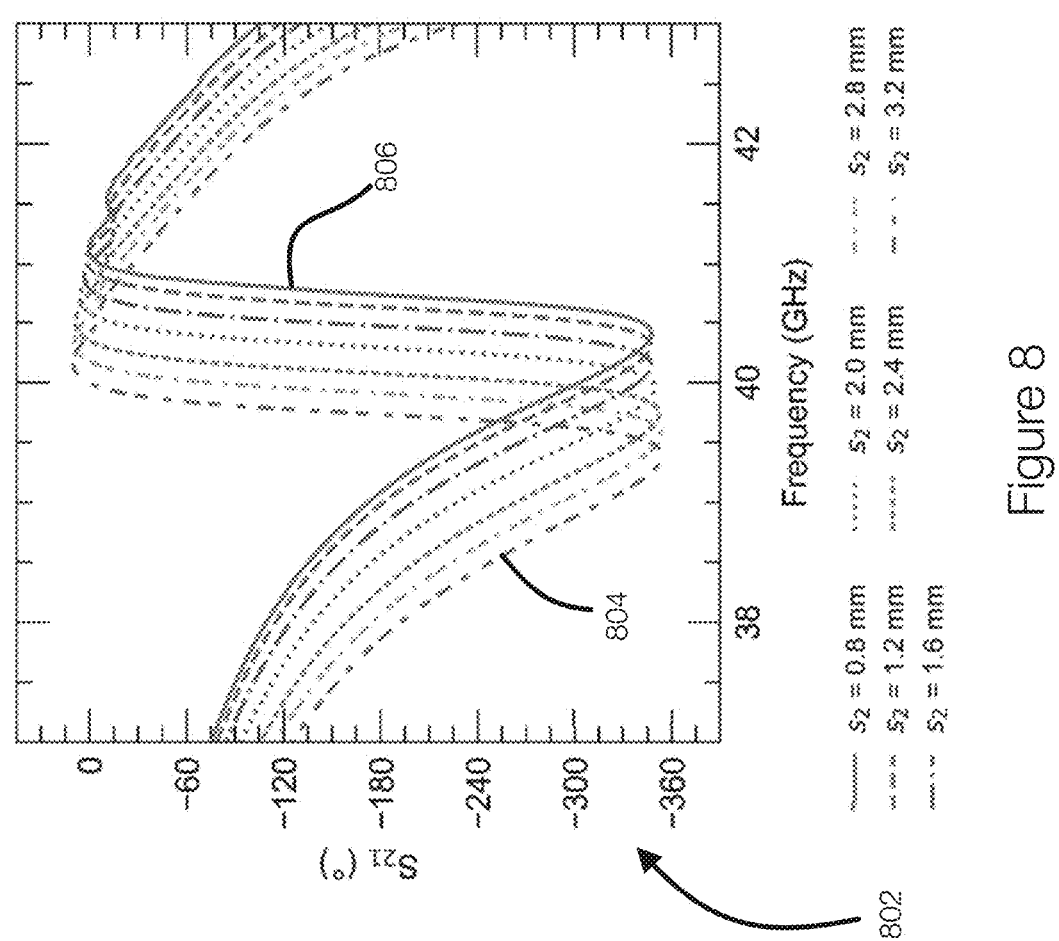
FIG. 8 discloses aspects of a simulated transmission phase response of a unit cell for different $S_2$ values.

FIG. 8 discloses aspects of a simulated transmission phase response of a unit cell for different $S_2$ values. The graph 802 illustrates a 330 degree phase change for different values of $S_2$ ranging from 0.8 mm to 3.2 mm. The response 804 corresponds to an $S_2$ value of 3.2 mm and the response 806 corresponds to an $S_2$ value of 3.2 mm.

Returning to FIG. 2B, the panel 250 may be configured (e.g., scaled) for mmWave electromagnetic waves or signals in one embodiment. As previously stated, the panel (or unit cells) may be scaled to operate at other frequencies that are lower or higher. In this example, a mmWave reflective surface is designed to include a two-dimensional periodic array of unit cells. The direction of the reflected beam depends on the phase profile over the surface 252. Thus, the reflection phase of each cell is selected such that it provides constructive interference in the desired direction. The desired reflection phase from a unit cell is achieved for a specific dimension of the middle square ring ($S_2$). In one example, the panel 250 may include an array of unit cells. However, the unit cells will have different $S_2$ dimensions. Some of the unit cells will have the same $S_2$ dimension. More generally, the patterns, including the $S_2$ dimensions are configured to provide the constructive interference needed to reflect the incident signal in a particular or desired direction.

Thus, the panel 250 can be configured and operated to selectively transmit or reflect a signal such as an electromagnetic wave. The panel 250 thus offers access to both sides of the space surrounding the panel 250. The panel configuration and/or unit cell configuration offers a small physical profile, broad operation band, and a large phase tuning range. Further, embodiments of the invention do not require a complex feed network and do not have manufacturing/fabrication issues such as soldering large numbers of on-chip components.

Reconfigurable intelligent surfaces can enhance the coverage area and quality of wireless networks, including in scenarios where obstructions (e.g., trees, buildings, metallic shells (cars)) impede the links between base stations or access points and end users or user equipment. These obstructions might include, by way of example, roadside trees, buildings, walls, or the metallic shells of vehicles.

For example, in outdoor communications, reconfigurable intelligent surfaces can be integrated into windows (e.g., car windows, plane windows, ship windows) to augment the signal strength using the transmission capabilities of reconfigurable intelligent surfaces discussed herein.

Embodiments of the invention also improve indoor-to-outdoor communications. In these scenarios, particularly at mmWave and THz frequencies, building walls can cause severe penetration loss, significantly limiting the coverage offered by outdoor base stations. Reconfigurable intelligent surfaces can act as a bridge from outdoor to indoor environments.

With indoor communications, reconfigurable intelligent surfaces capable of both transmission and reflection are more advantageous than surfaces that only reflect signals and only provide half space coverage. Embodiments of the invention can achieve full-space coverage due to the ability of providing both transmission and reflection capabilities. This could reduce the propagation distance and consequently enhance the received signal power.

Figure 9:
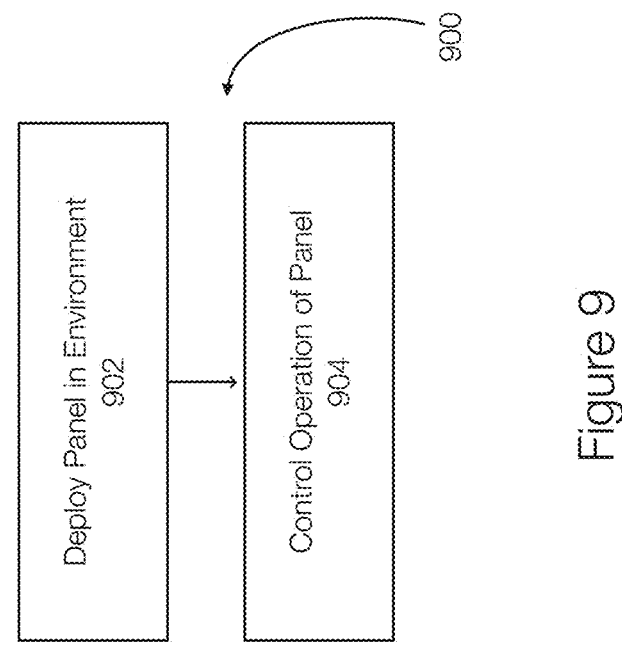
FIG. 9 discloses aspects of a method for operating a panel.

FIG. 9 discloses aspects of a method for transmitting and/or reflecting signals including electromagnetic waves. The method 900 includes deploying 902 a panel in an environment. In one example, a panel may include connections such that the panel can be connected to a power source or other controller. The controller (e.g., a computing device, server) may be local or remote with respect to the panel. The controller then controls 904 operation of the panel. The operation is controlled by placing the panel in a particular mode (e.g., transmission mode or reflection mode). This is achieved by controlling a voltage applied to the switch layer. Controlling the voltage allows the switch layer of the panel to transition from the metallic state to the insulator state or from the insulator state to the metallic state. The mode of the panel can be changed by the controller as needed, in response to user input, or for other reasons.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, signal processing operations, wireless coverage operations, signal steering or reflection operations, or the like. More generally, the scope of the invention embraces any operating environment in which the disclosed concepts may be useful.

It is noted that any operation(s) of any of the methods disclosed herein may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A panel comprising: a substrate, a metallic top layer formed on a first surface of the substrate, a switch layer formed on a second surface of the substrate, an insulator layer formed on the switch layer such that the switch layer is between the insulator layer and the substrate, and an actuation layer that includes activation contacts formed on a surface of the insulator layer, wherein the activation contacts are connected to the switch layer through the insulation layer.

Embodiment 2. The panel of embodiment 1, wherein the substrate comprises a dielectric material.

Embodiment 3. The panel of embodiment 1 and/or 2, wherein the metallic top layer includes a pattern for each unit cell included in the panel, wherein the pattern of each unit cell includes a center portion, a middle ring, and an outer ring.

Embodiment 4. The panel of embodiment 1, 2, and/or 3, wherein the center portion, the middle ring, and the outer ring are configured to resonate at a desired frequency.

Embodiment 5. The panel of embodiment 1, 2, 3, and/or 4, wherein the switch layer comprises a material configured to transition from a metallic state to an insulator state and from the insulator state to the metallic state.

Embodiment 6. The panel of embodiment 1, 2, 3, 4, and/or 5, herein a voltage applied to the switch layer via the activation contacts is controlled to place the panel in a reflection mode or to place the panel in a transmission mode.

Embodiment 7. The panel of embodiment 1, 2, 3, 4, 5, and/or 6, wherein the voltage is controlled to change a temperature of the switch layer.

Embodiment 8. The panel of embodiment 1, 2, 3, 4, 5, 6, and/or 7, further comprising a controller configured to change the voltage.

Embodiment 9. A panel comprising: a plurality of unit cells formed as a monolithic structure, the monolithic structure including: a substrate, a metallic layer that includes a metallic pattern for each of the plurality of unit cells, wherein the metallic layer is formed on a first surface of the substrate, a switch layer formed on a second surface of the substrate, an insulator layer formed on the switch layer such that the switch layer is positioned between the insulator and the substrate, and activation contacts that are exposed on the insulator layer and configured to contact the switch layer, wherein the patterns are configured such that when the panel is in a reflection mode, a constructive interference is generated such that an incident signal is reflected in a particular direction.

Embodiment 10. The panel of embodiment 9, wherein the activation contacts are positioned at corners of the insulator layer.

Embodiment 11. The panel of embodiment 9 and/or 10, wherein the activation contacts each correspond to locations of the panel that are not associated with a metallic pattern in the metallic layer.

Embodiment 12. The panel of embodiment 9, 10, and/or 11, wherein the metallic pattern comprises a center portion, a middle ring and an outer ring.

Embodiment 13. The panel of embodiment 9, 10, 11, and/or 12, wherein the center portion, the middle ring, and the outer ring are configured to resonate at a desired frequency.

Embodiment 14. The panel of embodiment 9, 10, 11, 12, and/or 13, wherein the substrate comprises a dielectric material.

Embodiment 15. The panel of embodiment 9, 10, 11, 12, 13, and/or 14, wherein the switch layer comprises a material configured to transition from a metallic state to an insulator state and from the insulator state to the metallic state and wherein dimensions of the switch layer are larger than dimensions of the insulator layer.

Embodiment 16. The panel of embodiment 9, 10, 11, 12, 13, 14, and/or 15, wherein the material of the switch later comprises $VO_2$.

Embodiment 17. The panel of embodiment 9, 10, 11, 12, 13, 14, 15, and/or 16, wherein a voltage applied to the switch layer via the activation contacts determines whether the switch later is in a metallic state or an insulator state.

Embodiment 18. The panel of embodiment 9, 10, 11, 12, 13, 14, 15, 16, and/or 17, wherein the panel is in a transmission mode when the switch layer is in the insulator state and wherein the panel is in the reflection mode when the switch layer is in the metallic state and wherein voltage is controlled to change a temperature of the switch layer.

Embodiment 19. The panel of embodiment 9, 10, 11, 12, 13, 14, 15, 16, 17, and/or 18, further comprising a controller configured to control a voltage applied to the activation contacts and transition the panel from the reflection mode to a transmission mode or from the transmission mode to the reflection mode.

Embodiment 20. The panel of embodiment 9, 10, 11, 12, 13, 14, 15, 16, 17, 18, and/or 19, wherein the pattern comprises a center portion having a dimension of $S_1$, a middle ring having a dimension of $S_2$ and an outer ring having a dimension of $S_3$, wherein $S_1 < S_2 < S_3$.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, service, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 10:
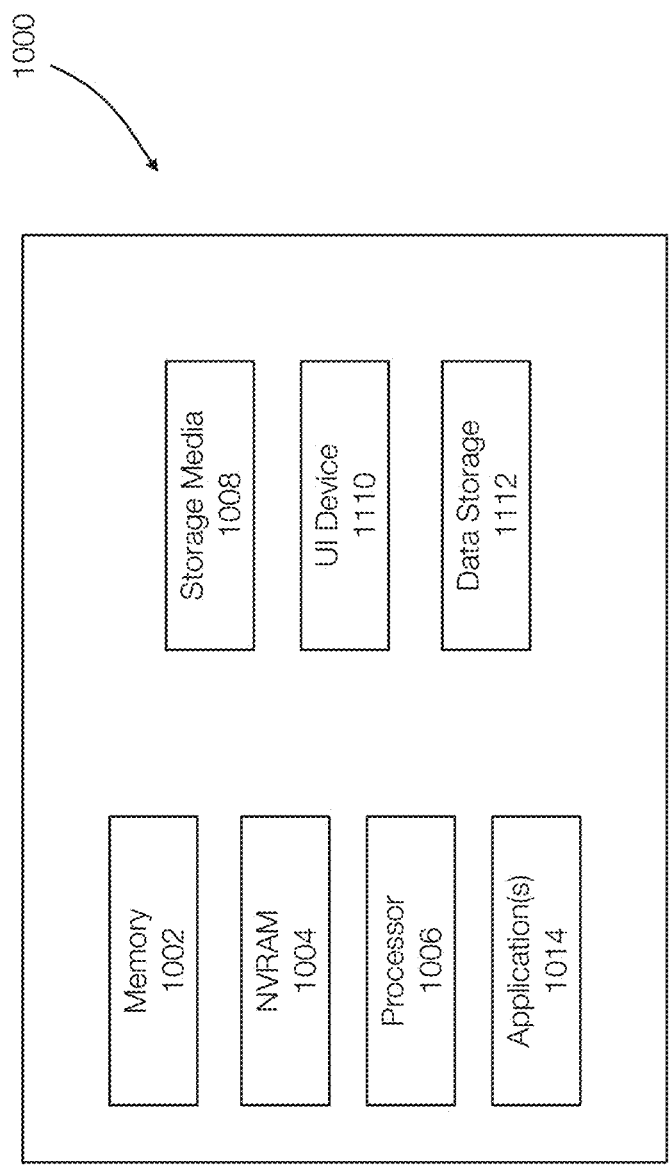
FIG. 10 discloses aspects of a computing device, system, or entity.

With reference briefly now to FIG. 10, any one or more of the entities disclosed, or implied, by the Figures and/or elsewhere herein, may take the form of, or include, or be implemented on, or hosted by, a physical computing device, one example of which is denoted at 1000. As well, where any of the aforementioned elements comprise or consist of a virtual machine (VM), that VM may constitute a virtualization of any combination of the physical components disclosed in FIG. 10.

In the example of FIG. 10, the physical computing device 1000 includes a memory 1002 which may include one, some, or all, of random access memory (RAM), non-volatile memory (NVM) 1004 such as NVRAM for example, read-only memory (ROM), and persistent memory, one or more hardware processors 1006, non-transitory storage media 1008, UI device 1010, and data storage 1012. One or more of the memory components 1002 of the physical computing device 1000 may take the form of solid state device (SSD) storage. As well, one or more applications 1014 may be provided that comprise instructions executable by one or more hardware processors 1006 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A panel comprising:
a substrate;
a metallic top layer formed on a first surface of the substrate;
a switch layer formed on a second surface of the substrate;
an insulator layer formed on the switch layer such that the switch layer is between the insulator layer and the substrate;
an actuation layer that includes activation contacts formed on a surface of the insulator layer, wherein the activation contacts are connected to the switch layer through the insulator layer;
wherein the metallic top layer includes a pattern for each unit cell included in the panel, wherein the pattern of each unit cell includes a center portion, a middle ring, and an outer ring; and
wherein the switch layer comprises a material configured to transition from a metallic state to an insulator state and from the insulator state to the metallic state.

2. The panel of claim 1, wherein the substrate comprises a dielectric material.

3. The panel of claim 1, wherein the center portion, the middle ring, and the outer ring are configured to resonate at a desired frequency.

4. The panel of claim 1, wherein a voltage applied to the switch layer via the activation contacts is controlled to place the panel in a reflection mode or to place the panel in a transmission mode.

5. The panel of claim 4, wherein the voltage is controlled to change a temperature of the switch layer.

6. The panel of claim 5, further comprising a controller configured to change the voltage.

7. A panel comprising:

a plurality of unit cells formed as a monolithic structure, the monolithic structure including:

a substrate;

a metallic layer that includes a metallic pattern for each of the plurality of unit cells, wherein the metallic layer is formed on a first surface of the substrate;

a switch layer formed on a second surface of the substrate;

an insulator layer formed on the switch layer such that the switch layer is positioned between the insulator layer and the substrate; and activation contacts that are exposed on the insulator layer and configured to contact the switch layer;

wherein the metallic patterns are configured such that when the panel is in a reflection mode, a constructive interference is generated such that an incident signal is reflected in a particular direction;

wherein the metallic pattern comprises a center portion, a middle ring, and an outer ring; and wherein the switch layer comprises a material configured to transition from a metallic state to an insulator state and from the insulator state to the metallic state and wherein dimensions of the switch layer are larger than dimensions of the switch layer are larger than dimensions of the insulator layer.

8. The panel of claim 7, wherein the activation contacts are positioned at corners of the insulator layer.

9. The panel of claim 8, wherein the activation contacts each correspond to locations of the panel that are not associated with the metallic pattern in the metallic layer.

10. The panel of claim 7, wherein the center portion, the middle ring, and the outer ring are configured to resonate at a desired frequency.

11. The panel of claim 7, wherein the substrate comprises a dielectric material.

12. The panel of claim 7, wherein the material of the switch layer comprises $VO_2$.

13. The panel of claim 7, wherein a voltage applied to the switch layer via the activation contacts determines whether the switch layer is in the metallic state or the insulator state.

14. The panel of claim 13, wherein the panel is in a transmission mode when the switch layer is in the insulator state and wherein the panel is in the reflection mode when the switch layer is in the metallic state and wherein voltage is controlled to change a temperature of the switch layer.

15. The panel of claim 7, further comprising a controller configured to control a voltage applied to the activation contacts and transition the panel from the reflection mode to a transmission mode or from the transmission mode to the reflection mode.

16. The panel of claim 7, wherein the metallic pattern comprises the center portion having a dimension of $S_1$, the middle ring having a dimension of $S_2$ and the outer ring having a dimension of $S_3$, wherein $S_1 < S_2 < S_3$.

* * * * *